July 13, 1926

Re. 16,380

L. W. GATES

WINDOW REGULATOR

Original Filed Sept. 7, 1920 2 Sheets-Sheet 1

INVENTOR.
Louis W. Gates

BY Stuart B. Barnes
ATTORNEY.

July 13, 1926.

Re. 16,380

L. W. GATES

WINDOW REGULATOR

Original Filed Sept. 7, 1920 2 Sheets-Sheet 2

INVENTOR.
Louis W. Gates
BY
Stuart C. Barnes
ATTORNEY.

Reissued July 13, 1926.

Re. 16,380

UNITED STATES PATENT OFFICE.

LOUIS W. GATES, OF NEW HAVEN, CONNECTICUT, ASSIGNOR TO TERNSTEDT MANUFACTURING CO., OF DETROIT, MICHIGAN, A CORPORATION OF MICHIGAN.

WINDOW REGULATOR.

Original No. 1,405,510, dated February 7, 1922, Serial No. 408,479, filed September 7, 1920. Application for reissue filed December 26, 1924. Serial No. 758,274.

This invention relates to window regulators, and has for its object a window regulator more especially adapted for windows that do not raise their full length. In automobile closed body construction, the rear quarter window rarely ever descends more than about half its length on account of the curvature of the body not permitting sufficient depth in the window pocket.

One of the features of the construction about to be described is that the same effects a positive lock for the window when it has been thrown to its uppermost position. This lock is over and above the usual clutch lock used in window lifts.

Another feature of the invention is the arrangement of the counterbalancing spring in this type of window lift in such a fashion that the same does not vibrate and result in the annoying noises which are usually incident to the customary spring used with this type of lifting lever.

Still another feature is the adjustability of the device in installing it, which will be fully explained hereinafter.

The regulator comprises a circular supporting plate *a* adapted to be engaged in a counterbored mortise *b* in the window board *c*. In fact, this is partially counterbored in the post *d*. This plate *a* is provided with a clutch housing *e*. The crankshaft *f* through the clutch *g* serves to rotate the pins *h*. This clutch *g* may be of any suitable construction so as to freely rotate the pinion and actuate it through the crankshaft but serving to lock when actuated through the pinion by a stress on the window. Clutches of this type are familiar and necessary to window lifts. The one here shown, but which will not be described, is one similar to that shown in the patent to Simpson et al., No. 1,343,410.

Figure 1:
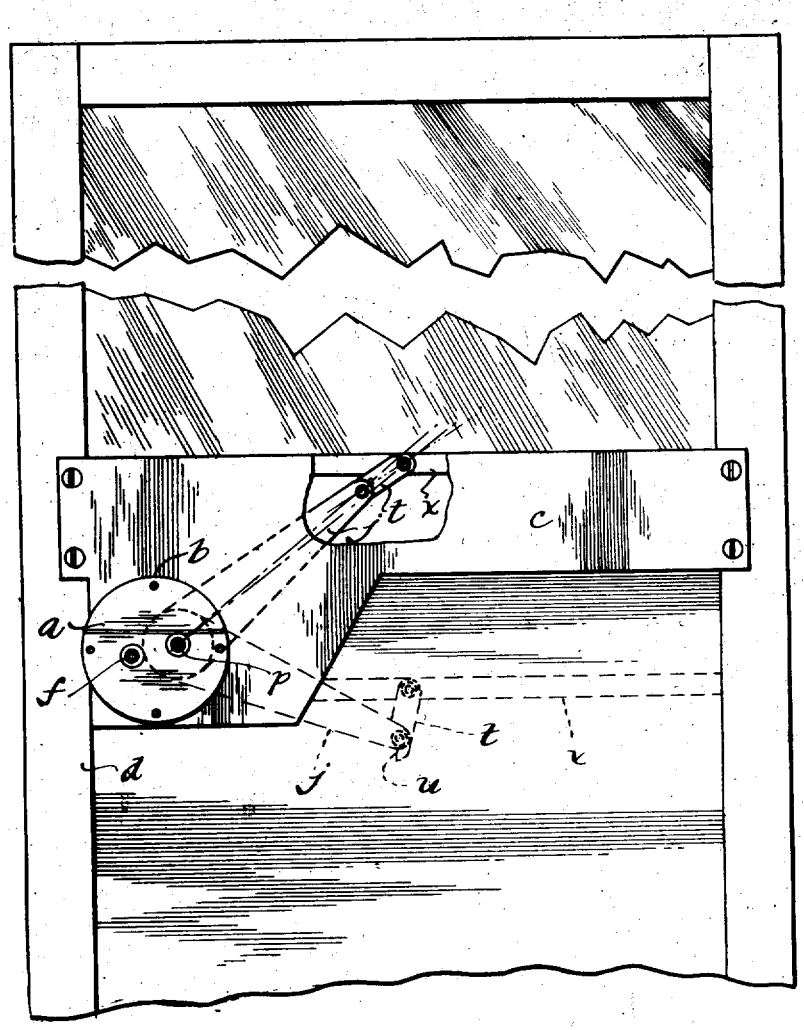
Fig. 1 is an inside elevation of a rear quarter window frame and window well, showing the window regulator arm in two positions.
Figure 2:
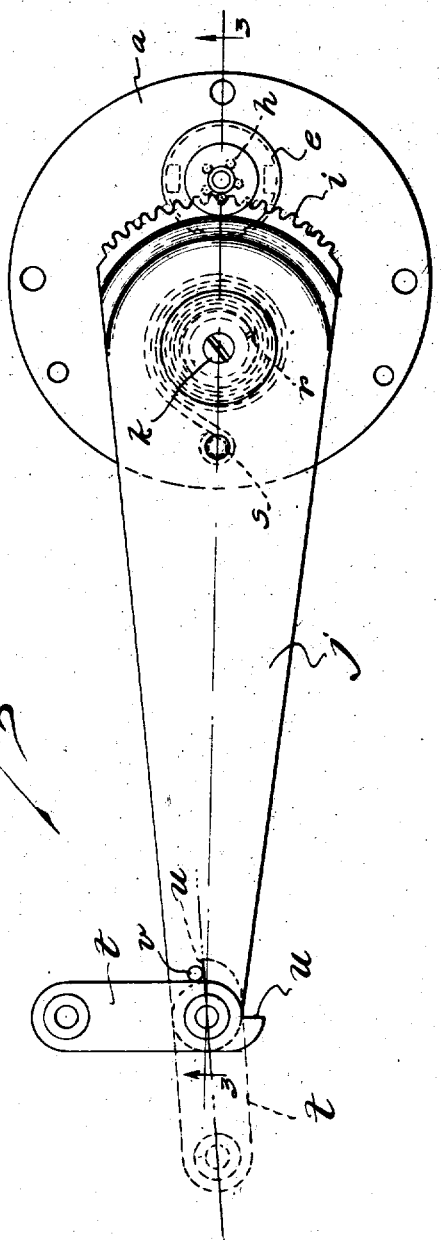
Fig. 2 is an inside elevation of the regulator, being a view taken from the right of Fig. 3.
Figure 3:
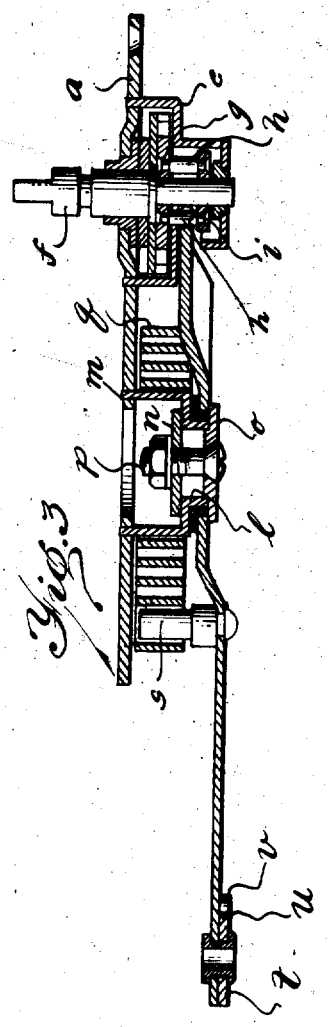
Fig. 3 is a section on the line 3—3 of Fig. 2.

It will be seen from Fig. 3 that the pins *h* are riveted to plates at their opposite ends so that the plates and the pins take the place of a driving pinion and may be broadly referred to as a driving member. These pinions mesh with the teeth of the segment *i* on the end of the lever *j*. This lever is fulcrumed at *k* on the hollow stud *l* riveted to the supporting plate *a* by means of the legs *m*. The two discs *n* and *o* are bolted together by the cap screw and nut *p*, and serve to form a collar to hold the lever onto the stud.

The enlarged portion of the stud forms a seat for the counterbalancing spring *q*, one end of which is fastened to the stud at *r*, the opposite end of which is rolled over the rivet *s* attached to the lever.

On the end of the lever is pivoted the link *t* provided with a shoulder *u* adapted to engage with the pin *v*. The regulator is assembled onto the window frame by first attaching the link to the bottom rail *x* of the window. The window is then shoved up to the desired limit of its upward travel and the link and lever are straightened out with the shoulder against the stop. A counterbored mortise *b* has already been cut in the window board. With the lever and the link on a straight line so that the distance from the center of the supporting plate to the pivoting of the link on the bottom window rail is equal to the distance between the center of the counterbored mortise and this pivoting point of the link, the supporting plate will fit into the counterbore nicely. However, this will vary slightly in nearly all jobs, but it may be taken care of by simply turning the supporting plate slightly about the fulcrum of the lever. This fulcrum of the lever upon the supporting plate being eccentric, obviously the distance between the center of the supporting plate and the pivoting of the link to the window rail may be progressively increased or decreased by simply turning the supporting plate about this eccentric fulcrum. When such turning has been done as to accurately fit the supporting plate and the counterbore, it is then fastened to the counterbore by screws.

The shoulder and the stop perform a very useful function. They not only serve to line the lever and the link up to a substantially straight line for the purpose already described, but also for another purpose.

With the window at its uppermost limit and with the link and the lever maintained on a straight line in this position, and as the lever and link are also disabled from breaking except in one direction, it will be clear that this forms a positive lock, preventing any effort applied to the window from causing it to descend. The window is constrained to slide in a vertical path by the window guides; hence the thrust of the window upon the link is a dead center thrust from one pivot of the link to the other, or else it tends to break the link and lever in the direction that these members cannot break. In short, it amounts to a thrust on the center line of the three pivots of a toggle when these pivots are all on said center line, or else the pivot of the knee of the toggle is slightly over the center line and restrained from any further movement in that direction. This forms an effective lock which can only be broken by a force which has a component that travels at right angles to the center line of the toggle.

The usual clutch lock may or may not be used. Of course, it will be necessary if it is desired to lock the window in an intermediate position.

What I claim is:

1. In a window construction, the combination of a window frame provided with a pair of opposed vertical window guides and a window well, a sash slidable vertically therein, a regulator plate located at substantially the side of the window well, a relatively long lever fulcrumed on the said plate, a relatively short link pivoted to the end of the long lever and at substantially the center of the sash, the said lever and link being on substantially a straight line position or dead center when the window is in its uppermost position, and means on said regulator plate associated with the lever at its fulcrum end for causing the said lever to swing upon its fulcrum.

2. In a window construction, the combination of a window frame provided with a pair of opposed window guides and a window well, a sash slidable therein vertically, a regulator plate located at substantially the side of the window well, a relatively long lever fulcrumed on said plate and arranged to swing from a position in which its end of larger sweep is below the fulcrum to a position when such end is above the fulcrum, means for actuating said lever, and a relatively short link pivoted to the end of the long lever and the bottom of the sash at substantially the center, the said lever and link being arranged to break on only one side of their straight line position and arranged so that they are in their substantially straight line position when the window is in its uppermost position so as to lock the window from descending.

3. In a window construction, the combination of a window frame provided with a pair of opposed vertical window guides and a window well, a sash slidable vertically therein, a regulator plate located near one side of the window well, a relatively long lever fulcrumed on said plate and arranged to swing above and below its fulcrum point, means for actuating the lever, and a relatively short link pivoted to the end of the long lever and to substantially the middle of the bottom of the sash, the said lever and link being provided with a stop and shoulder arrangement to prevent the lever and link breaking on the upper side of their straight line position, which straight line position they assume when the window is in its uppermost position.

4. In a window construction, the combination of a window constrained to slide vertically, a window board, a sustaining plate which may be applied to the window board, a lever eccentrically fulcrumed on the supporting plate, a link connecting the end of the lever with the bottom of the window, and a stop and shoulder that limits the breaking of the lever and the link, the said sustaining plate being applicable to the window board in a plurality of angular positions on a single center which by reason of the eccentricity of the fulcruming of the lever permits the lever and link to be moved relatively to bring the stop and shoulder together when the window is in its uppermost position.

5. In a window construction, the combination of a window frame including a window board counterbored to form a plate-receiving mortise, a window constrained to slide vertically in said window frame, and a window regulator provided with a circular mortise and having also a lever arm and link connected together with a stop and shoulder arrangement, the said lever being fulcrumed upon the plate eccentrically whereby with the window in its uppermost position of travel the plate may be rotated in the counterbore to bring the lever and link into a position where the stop and shoulder engage.

6. In a window regulator, a supporting plate provided with a hollow stud, a combined lever and gear segment fulcrumed on said stud, means within the hollow of said stud for assembling the lever upon said stud, and a counterbalancing spring coiled about the stud and having one end fastened to the lever and the opposite end fastened to the stud.

7. In a window regulator, the combination of a supporting plate, a hollow stud supported thereon and having two diameters, the periphery of the stud of one diameter fulcruming on the combined lever and gear segment, and a pair of discs bolted together at the portion of smaller diameter to hold the combined gear segment and lever assembled upon the stud.

8. In a window construction, the combination of a window constrained to slide vertically, a window board, a supporting plate which may be applied to the window board, a lever eccentrically fulcrumed on the supporting plate, a link connecting the end of the lever with the bottom of the window, the said supporting plate being applicable to the window board in a plurality of angular positions on a single center which by reason of the eccentric fulcruming of the lever permits the lever and link to be moved relatively to bring the lever and link substantially on a line when the window is in its uppermost position.

In testimony whereof, I hereto affix my signature.

LOUIS W. GATES.